(12) United States Patent
Li et al.

(10) Patent No.: US 10,183,878 B2
(45) Date of Patent: Jan. 22, 2019

(54) FENTON FLUIDIZED BED TREATMENT APPARATUS AND WASTEWATER TREATMENT METHOD THEREOF

(71) Applicants: NANJING UNIVERSITY, Nanjing (CN); NANJING UNIV. YANCHENG ENVIRON. PROTECTION TECHNOLOGY AND ENGR. RES. INST., Yancheng (CN)

(72) Inventors: Aimin Li, Nanjing (CN); Ke Shen, Nanjing (CN); Bicun Jiang, Nanjing (CN); Chendong Shuang, Nanjing (CN); Fuqiang Liu, Nanjing (CN)

(73) Assignees: Nanjing University, Nanjing (CN); Nanjing University Yancheng Environmental Protection Technology and Engineering Research Institute, Yangcheng (CN)

( * ) Notice: Subject to any disclaimer, the term of this patent is extended or adjusted under 35 U.S.C. 154(b) by 126 days.

(21) Appl. No.: 15/118,734

(22) PCT Filed: Oct. 16, 2014

(86) PCT No.: PCT/CN2014/088710
§ 371 (c)(1),
(2) Date: Aug. 12, 2016

(87) PCT Pub. No.: WO2015/123996
PCT Pub. Date: Aug. 27, 2015

(65) Prior Publication Data
US 2017/0044036 A1  Feb. 16, 2017

(30) Foreign Application Priority Data
Feb. 19, 2014 (CN) .......................... 2014 1 0056665

(51) Int. Cl.
*C02F 1/72*  (2006.01)
*C02F 1/28*  (2006.01)
(Continued)

(52) U.S. Cl.
CPC .............. *C02F 1/725* (2013.01); *C02F 1/281* (2013.01); *C02F 1/283* (2013.01); *C02F 1/286* (2013.01);
(Continued)

(58) Field of Classification Search
None
See application file for complete search history.

(56) References Cited

U.S. PATENT DOCUMENTS

| 3,642,617 A | * | 2/1972 | Brink | ....................... B03D 1/02 |
| | | | | 209/170 |
| 6,143,182 A | | 11/2000 | Huang et al. | |
| 2007/0039894 A1 | * | 2/2007 | Cort | ......................... C02F 1/488 |
| | | | | 210/695 |

FOREIGN PATENT DOCUMENTS

| CN | 102249393 A | 11/2011 |
| CN | 202107568 U | 1/2012 |

(Continued)

*Primary Examiner* — Chester T Barry
(74) *Attorney, Agent, or Firm* — Seed IP Law Group LLP

(57) ABSTRACT

The present invention discloses a device for Fenton fluidized-bed process and a method applying the device for wastewater treatment. It belongs to the wastewater treatment field. The device comprises an adjusting tank, a lift pump and a main reaction column. The adjusting tank is connected to a water distributing trough on the top of the main reaction column through the lift pump; the main reaction column is filled with the packing material, and below the packing material is equipped with an obcone, whereon a plurality of inlets are provided and a slag discharge pipe is connected to the bottom; above the packing material is installed an inclined plate, above which and at the upper end of the main reaction column are arranged with a partitioned trough and an outflow trough; the partitioned trough is evenly divided by a vertical plate into two independent chambers; the upper end of each chamber is connected to the water distributing (Continued)

trough while the lower end of each chamber is designed with an outlet; the outlets of the two independent chambers are connected to the inlets on the obcone through the first circulation pump and the second circulation pump respectively; the outflow trough is installed opposite the partitioned trough. When being used to treat biotreated wastewater, the device disclosed in the present invention can enhance use efficiency of the reagent, and maintain high effect and stability in eliminating iron in the wastewater.

12 Claims, 2 Drawing Sheets

(51) Int. Cl.
    *C02F 1/66*         (2006.01)
    *C02F 103/34*      (2006.01)

(52) U.S. Cl.
    CPC ............... *C02F 1/722* (2013.01); *C02F 1/66* (2013.01); *C02F 2103/34* (2013.01); *C02F 2201/002* (2013.01); *C02F 2305/026* (2013.01)

(56) References Cited

FOREIGN PATENT DOCUMENTS

| | | |
|---|---|---|
| CN | 202139138 U | 2/2012 |
| CN | 102642911 A | 8/2012 |
| CN | 102774953 A | 11/2012 |
| CN | 202643404 U | 1/2013 |
| CN | 202688073 U | 1/2013 |
| CN | 202785780 U | 3/2013 |
| CN | 202898099 U | 4/2013 |
| CN | 103755007 A | 4/2014 |

* cited by examiner

FENTON FLUIDIZED BED TREATMENT APPARATUS AND WASTEWATER TREATMENT METHOD THEREOF

BACKGROUND

Technical Field

The present invention relates to the wastewater treatment field, and specifically to a device for Fenton fluidized-bed process and a method applying the device for wastewater treatment.

Description of the Related Art

There are still many kinds of recalcitrant organic pollutants in the wastewater that has undergone biological treatment, which leads to under-standard discharge of the effluent, particularly the effluent initially generated from the chemical wastewater in dyeing, paper-making and nitrification fields. However, the Chinese government is implementing increasingly strict regulations upon water treatment and also attaching increasingly great emphasis upon the use of reclaimed water, which consequently makes it necessary to have a deep treatment process for biotreated effluent. Due to potent oxidation capability of hydroxy radicals it releases, Fenton reagent exerts excellent effect in removing recalcitrant pollutants; when adopted in wastewater treatment, it features simple technical procedure, low investment cost and desirable treatment results, which explains its wide application in the field. However, the conventional methods that adopt Fention oxidation process are considerably inefficient in utilizing the reagent, and usually result in high yield of unwanted iron-containing sludge.

The water quality of chemical wastewater varies greatly in different industries and different factories, and the composition of organic pollutants and their respective contents therein are different enormously as well. The fluidized-bed Fention reagent, by means of adjusting the added amount of and the percentage of various components therein, can be utilized in the treatment of wastewater of various origins. For example, the added amount of the reagent (as a whole) is comparatively higher than usual when the Fention fluidized bed is utilized to treat the wastewater containing recalcitrant organic pollutants or highly concentrated organic pollutant; the increase of ferrous iron is favorable when it is utilized to treat the wastewater containing highly concentrated cellulose or hemicellulose, for example, paper-making wastewater (namely, the percentage of ferrous iron in the reagent is higher than that used for treating other types of wastewater).

The Fenton fluidized-bed process can change trivalent iron, which is prone to form iron-containing sludge, into the crystals of iron oxide catalyst, which then deposit on the surface of the packing material. This crystallization process of the packing material can not only effectively reduce the amount of the catalyst carried away by water flow, but also enhances the efficiency of catalytic oxidation due to the existence of heterogeneous catalysis and reduction/dissolution process. However, to realize this process, the design of the fluidized-bed device is of great importance. Chinese Patent CN202898099U disclosed a Fenton fluidized-bed device. By fixing the catalyst within the device, it reduces the yield of iron-containing sludge. However, the heterogeneous catalysis therein is inefficient and the quality of water within the pre-mixing area is not homogeneous due to lack of appropriate mixing measures. Chinese Patent CN202688073U also disclosed a Fenton fluidized-bed device which adopted a guide pipe to extend the treatment process and realize reagent addition at multiple spots. This design enhances the efficiency in both reagent use and wastewater treatment as a whole, but it fails to take into account the separation, circulation and distribution of the solid packing material within the device; besides, the operational procedure is also cumbersome. Chinese Patent CN202139138U disclosed a Fenton fluidized-bed device connected to an iron-bed micro-electrolysis reactor. Said reactor bears no measures for separation of the packing material, which makes it hard to realize homogeneous water distribution when put into a large scale application. In addition, the device, instead of utilizing the high position of the effluent outlet of the prior reactor, provides with an extra ejector, which resulted in unnecessary energy consumption. The Fenton fluidized-bed devices disclosed in both Chinese Patents CN102774953A and Chinese Patent CN202643404U present a defect that the inflow tanks designed therein are intolerable for the impact of the inflow load, which may cause splashes when the head margin appears; in addition, the devices also has other limitations such as nonuniform water quality due to lack of mixing measures for the reagent added downstream of the pump, clogging of the water distributor by the packing material, uneven water distribution when put into a large scale application, and difficulty in slag discharge operation. Chinese Patent CN 202785780U disclosed an air-lift Fenton fluidized-bed device, which also presents the defect mentioned above, namely, the inflow tank designed therein is intolerable for the impact of the inflow load, and splashes may occur when the head margin appears; in addition, the device also bears other limitations, such as (1). the reaction effect is damaged due to the fact that the two reflux streams can't obtain sufficient mixing; (2). crystallization process is damaged due to strong turbulence within the air-lift pipe; (3). Both investment cost and operating cost are increased to form an air-lift fluidized bed with the existence of reflux; (4). the device fails to take into consideration how to discharge the enlarged particles of the crystallized packing material.

In summary, according to the disclosure of previous patents on Fenton fluidized-bed devices, there exist a variety of descriptive ways and designing patterns in term of such essential steps of Fenton fluidized-bed process as the reflux mode of the inflow water, water distribution, separation, slag discharge and fluidization. However, all of them present some defects when being put into engineering application. In view of the defects prevalent in the prior art of designing a Fenton fluidized-bed device such as long retention time, the channel flow caused by uneven water distribution, low use efficiency of the reagent, and undesirable iron-eliminating effect (the content of iron in the effluent being higher than the amount required for the coagulation/precipitation process), the present invention provides an improved device for the Fenton fluidized-bed oxidation process.

BRIEF SUMMARY

1. The Technical Problem to be Solved

With respect to problems existing in the prior art of designing a Fenton fluidized-bed device, such as long retention time of wastewater, the channel flow caused by uneven water distribution, low use efficiency of the reagent, and undesirable iron-eliminating effect (the content of iron in the effluent being higher than the amount required for the coagulation/precipitation process), the present invention provides a device for Fenton fluidized-bed process and a method applying the device for wastewater treatment. It can improve use efficiency of the reagent, and maintain high effect and stability in eliminating iron in the wastewater.

2. Technical Solution

The objective of the present invention is realized through the following technical solution:

A device for Fenton fluidized-bed process, comprising an adjusting tank, a lift pump and a main reaction column. The adjusting tank is connected through the lift pump to the water distributing trough located on the top of the main reaction column; said main reaction column is filled with the packing material, and its bottom is designed in the form of an obcone. Wastewater inlets are designed on the side of said obcone and a slag discharge pipe is connected to the bottom of said obcone;

above the packing material within said main reaction column is installed an inclined plate, above which and at the upper end of said main reaction column are arranged with a partitioned trough and an outflow trough; said partitioned trough is evenly divided by a vertical plate into two independent chambers; the upper end of each chamber is connected to said water distributing trough while the lower end of each chamber is designed with an outlet; the outlets of said two independent chambers are connected to the inlets of said obcone through the first circulation pump and the second circulation pump respectively; said outflow trough is installed opposite the partitioned trough.

Preferably, two pairs of inlets, 4 inlets in total, are symmetrically provided ⅓ and ⅔ of the way up from the bottom of the obcone; the design enables the mixed fluid out of the two independent chambers to be evenly divided into two streams after it flows out of the first circulation pump and the second circulation pump respectively.

Preferably, on the top of said water distributing trough is designed with an adjusting pipe for controlling the inflow load; the other end of the adjusting pipe is connected back to said adjusting tank.

Preferably, the conical angle of said obcone is 5-60°.

Preferably, said packing material is any of the following materials: resin, activated carbon, building sand, quartz sand, zeolite, ceramsite, saponite or brick chips, or any combination thereof; the average particle size of the packing material is 0.1-3.0 mm.

Preferably, a plurality of guide plates are arranged within the packing material alongside the vertical axis of the main reaction column; which is therefore divided into a plurality of upflowing tunnels; the distance between the lower edge of the guide plates and the upper end of the obcone is 1-4 m.

A method for wastewater treatment using said device for Fenton fluidized-bed process, comprising the following steps:

(a). fill the main reaction column with the packing material, which accounts for 10%-40% of the total volume of the main reaction column;

(b). adjust the pH value of wastewater in the adjusting tank so that the pH value of wastewater in the reaction column can be controlled at 3.0-4.0; adjust the flow rate of the inflow wastewater to guarantee 10-30 min of retention time for the wastewater within the main reaction column;

(c). the wastewater in the adjusting tank is pumped by the lift pump into the water distributing trough, and then flows into the two independent chambers of the partitioned trough, wherefrom the wastewater is pumped by the first circulation pump and the second circulation pump respectively through the inlets on the obcone into the main reaction column; adjust the reflux ratio and control the upflowing rate within the main reaction column at 30-150 m/h; keep the upper edge of the guide plates lower than the top layer of the suspended packing material;

(d). hydrogen peroxide solution and ferrous sulfate solution are added into the two independent chambers of the partitioned trough respectively (the added amount of said two solutions depending on the quality of wastewater), and then, along with the water flow, are pumped by the first circulation pump and the second circulation pump respectively into the obcone;

(e). a whirled flow is generated within the obcone, which guarantees water being homogeneously mixed; the mixed fluid then reacts with the packing material; after being propelled by the plug flow generated by the guide plates and the subsequent separation process, part of the supernatant of the mixed fluid flows back into the independent chambers of the partitioned trough while the other part of the supernatant of the mixed fluid flows into the outflow trough and is discharged thereafter;

(f). after a week of operation, reduce the added amount of ferrous sulfate by 50%, and the slag discharge operation is conducted after 6-12 months of operation.

Preferably, the packing material mentioned in said step (a), is added in two portions: 75%-85% of its total amount is added at the first time, and the rest 15%-25% is added in after 50-500 h of operation.

3. Beneficial Effects

In comparison with the prior art, the present invention bears the following advantages:

(1). A water distributing trough is provided on the top of the main reaction column disclosed in the present invention. This arrangement effectively eliminates on the one hand occurrence of splashes within the partitioned trough by buffering the head margin impact caused by the lift pump, and on the other hand the phenomenon that the inflow water directly flushes into the effluent via the bottom outlets of the partitioned trough; the adjusting pipe arranged on the top of the water distributing trough will channel the surplus water back to the adjusting tank when the water load is too heavy. A partitioned trough is provided at the top of the main reaction column; said partitioned trough consists of two independent chambers, each chamber having a bottom outlet at the inner side; the ferrous sulfate solution and the hydrogen peroxide solution are added separately into said two chambers and then flow along with the water flow; this design can on the one hand utilize the effluent to dilute the inflow load and on the other hand enhance the use efficiency of the reagent by preventing premature reaction between ferrous sulfate and hydrogen peroxide;

(2). Along the same tangent direction of the conical surface, two pairs of inlets, 4 inlets in total, are symmetrically arranged ⅓ and ⅔ of the way up from the bottom of the obcone; the two independent chambers of the partitioned trough are connected to the inlets on the obcone through the first circulation pump and the second circulation pump respectively; a whirled flow is generated within the obcone as the four inlets lead the water tangentially into the obcone from two different altitudes, which guarantees sufficient mixing of the reagent, the wastewater and the packing material; the whirled flow can not only eliminate short circuiting caused by uneven distribution of water, but also separate apart the crystallized packing material around the bottom of the reaction column as the oversized particles precipitate down into the obcone and then are discharged away; meanwhile, the high-speed whirled flow results in constant friction and collision between large particles of the packing material, which then break up into smaller particles and act as new seed crystals to maintain the activity of the packing material and the fluidized state in the main reaction column;

(3). The conical angle is arranged at 5-60° as too small an angle is inconvenient to collect oversized particles due to lack of necessary inclination while too big an angle requires on the one hand a higher reaction column and on the other hand a stronger whirled flow, which brings not only heavy impact upon the guide plates, but the need for a higher reaction column as well;

(4). The packing material with the particle size between 0.1-0.3 mm is chosen, as oversized particles are less prone to quick crystallization due to their smaller specific surface area while undersized particles are prone to being carried away by the water flow and consequently unstabilize the fluidized state;

(5). A plurality of guide plates are provided from bottom to top within the main reaction column, and above said guide plate is arranged with an inclined plate. The guide plates divide the inner space of the main reaction column into a plurality of upflowing tunnels, which can on the one hand prevent the emergence of turbulence caused by the oversized inner diameter of the column or the undulations of the inflow water, and on the other hand turn the whirled flow at the bottom of the column into a stable upgoing plug flow; the bed height and fluidization quality are therefore improved; adjust the position of the lower edge of the guide plates to control the impact intensity between the whirled flow and the guide plates so that the large particles coated with a thick crystallized layer can break up into small pieces and then act as new seed crystals. The inclined plate is utilized to retain the small-sized and broken particles within the main reaction column, which on the one hand prevents these particles to flow into circulation pumps (thus, no need to increase the height of the column for separating the packing material) and on the other hand keeps high iron-eliminating efficiency by maintaining high concentration of seed crystals within the column. Finally, part of the effluent is discharged out through the outflow trough located above the inclined plate and opposite the partitioned trough, while the other part of the effluent flows back into the column through the partitioned trough; the symmetrical arrangement of the outflow trough and the partitioned trough is, apart from the aesthetic purpose, good for stabilizing the effluent;

(6). The distance between the guide plates and the obcone is kept at 1-4 m, the exact distance depending on the height of the main reaction column; if the distance in between is too narrow, the whirled flow generated therein will be severely damaged or even eliminated, and the sufficient mixing of the reaction system cannot be guaranteed without the existence of the whirled flow; if the distance in between is too wide, the slackened collision between the particles and the guide plates is not strong enough to break up the oversized particles into pieces, meanwhile, as the upper edge of the guide plates may therefore be higher than the top layer of the suspended packing material, the space for equilibrium within divided tunnels is compromised and subsequently leads to unbalanced plug flow between different tunnels;

(7). According to the steps disclosed in the present invention, the packing material added into the main reaction column accounts for 10%-40% of the total volume of the column; this amount of added packing material can on the one hand reduce cost without compromising the crystallization effect and on the other hand lower down the load of the fluidized bed; control the pH value at 3.0-4.0 to obtain the best crystallization effect, which in turn benefits the removal of iron-containing sludge; control the upflowing rate at 30-150 m/h and keep the upper edge of the guide plates lower than the top layer of the suspended packing material so that the simultaneous equilibrium is reached within all tunnels; hydrogen peroxide and ferrous sulfate are added separately into the two chambers of the partitioned trough, which improves the use efficiency of the reagent by on the one hand preventing premature reaction between hydrogen peroxide and ferrous sulfate and on the other hand diluting the wastewater; after a week of operation, reduce the added amount of ferrous sulfate by 50% as the heterogeneous catalysis of γ-FeOOH (γ-ferric oxyhydroxide) crystals generated therein can be further utilized, a method reducing both the general cost and the yield of iron-containing sludge;

(8). The packing material is added in two portions: 75%-85% of its total amount is added at the first time so that the comparatively higher activity of the fresh packing material can be fully utilized to obtain desirable iron-eliminating effect; after a week of operation, the suspended state of the packing material is compromised due to crystallization process and accumulation of crystals; in addition, γ-FeOOH (γ-ferric oxyhydroxide) that deposits on the surface of the packing material also inhibits further crystallization of $Fe^{3+}$ to some extent; the rest 15%-25% of the packing material is added in at this moment so that the activity of the packing material can be maintained; meanwhile, as the newly added particles are smaller in size than those having undergone crystallization, stratification of particles of different sizes is observed in the reaction column, which can enhance the effect of iron-eliminating process by increasing the height of suspended packing material.

DETAILED DESCRIPTION

The present invention is illustrated in detailed with reference to the appended drawings and the following embodiments.

Embodiment 1

Figure 1:
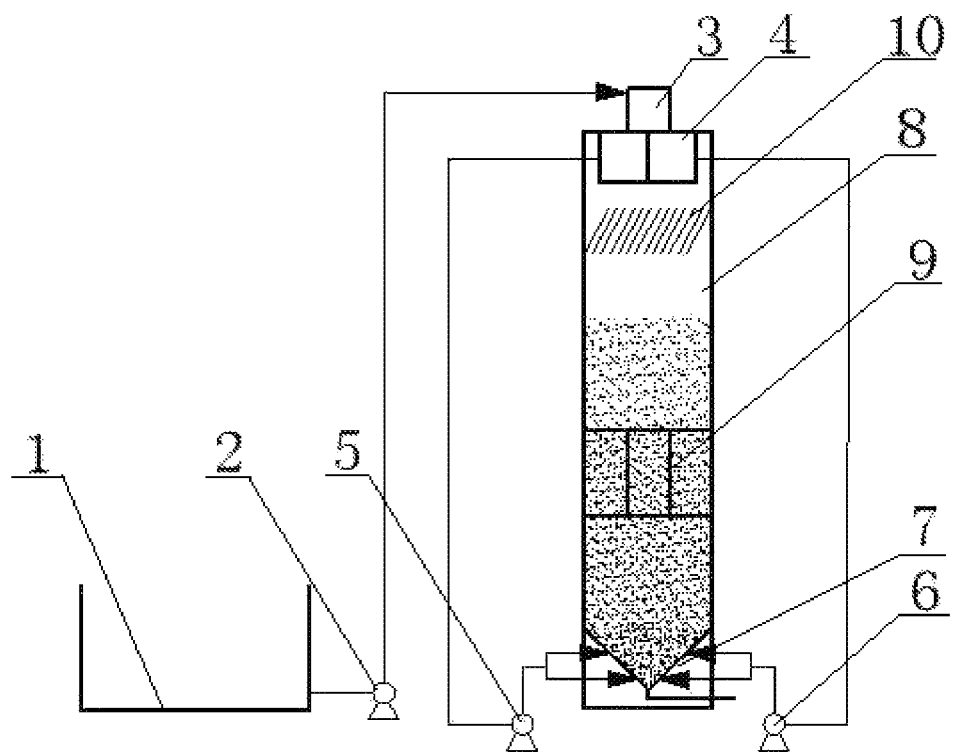
FIG. 1 is the front view of the device for Fenton fluidized-bed process.
Figure 2:
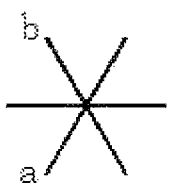
FIG. 2 is the top view of the guide plates.
Figure 3:
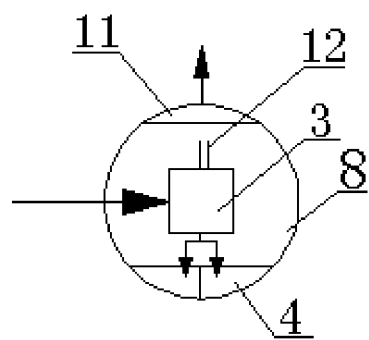
FIG. 3 is the top view of the main reaction column.
Figure 4:
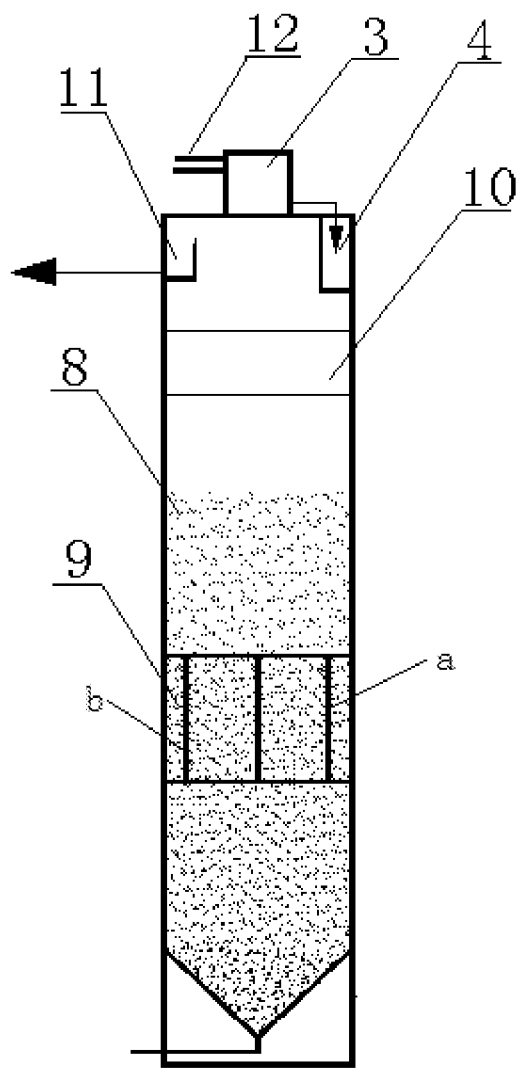
FIG. 4 is the left view of the main reaction column.
wherein:
1. adjusting tank; 2. lift pump; 3. water distributing trough; 4. partitioned trough; 5. first circulation pump; 6. second circulation pump; 7. obcone; 8. main reaction column; 9. guide plates; a. guide plate, b. guide plate; 10. inclined plate; 11. outflow trough; 12. adjusting pipe.

In this embodiment, a device for Fenton fluidized-bed process is described with reference to FIG. 1-4. Said device for Fenton fluidized-bed process comprises an adjusting tank 1, a lift pump 2 and a main reaction column 8; the adjusting tank 1 is connected to a water distributing trough 3 on the top of the main reaction column 8 through the lift pump 2; an adjusting pipe 12 is provided on the top of the water distributing trough 3 to control the inflow load as the other end of the adjusting pipe is connected back to said adjusting tank 1. The water distributing trough 3 is separately connected to the two independent chambers of a partitioned trough 4; the water out of the partitioned trough is divided by the chambers into two channels and flows through the first circulation pump 5 and the second circulation pump 6 respectively; then each channel is further evenly divided into two streams and tangentially flows into an obcone 7—the inflow component of the main reaction column 8—through 2 outlets arranged at ⅓ and ⅔ of the way up from the bottom of the obcone 7 respectively; such a design guarantees a whirled flow being generated within the obcone 7; the conical angle of the obcone 7 is 60'; resin with the particle size at 0.1 mm is filled in the main reaction column 8 as the packing material; guide plates 9 are arranged 1 m above the obcone 7 within the main reaction column 8 so that a plug flow can be generated therein and crystallized particles can be broken up into pieces to form new seed crystals; an inclined plate 10 is arranged above the guide plates 9 to separate solid particles from the effluent; finally, part of the supernatant flowing up through the inclined plate 10 flows back into the partition trough 4 while the other part of the supernatant flows out from the outflow trough 11 opposite the partition trough 4.

A method for wastewater treatment using the device for Fenton fluidized-bed process disclosed in this embodiment, comprising the following steps:

(a). 75% of the total amount of resin (accounting for 10% of the total volume of the main reaction column 8) with the particle size at 0.1 mm is initially added into the main reaction column 8;

(b). adjust the pH value of wastewater in the adjusting tank 1 so that the pH value of wastewater in the reaction column 8 can be controlled at 3.0; adjust the flow rate of the inflow wastewater to guarantee 10 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 30 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 25% of the total amount of resin with the particle size at 0.1 mm is added in after 50 h of operation;

(g). after a week of operation, reduce the added amount of ferrous sulfate by 50%, and the slag discharge operation is conducted after 12 months of operation.

The device for Fenton fluidized-bed process and the wastewater treatment method thereof disclosed in this embodiment were adopted to treat a biologically treated wastewater discharged from a chemical industry park with COD 114 mg/L and a certain degree of chromaticity; the ratio of added hydrogen peroxide was 0.1% while that of added ferrous iron was 200 mg/L. The results showed that the removal rate of chromaticity, COD and iron reached 100%, 76.56% and 74.34% respectively; after reducing the added amount of ferrous iron by 50%, the removal rate of COD was 73.96%.

Embodiment 2

In this embodiment, a device for Fenton fluidized-bed process is described with reference to FIG. 1-4. Said device for Fenton fluidized-bed process comprises an adjusting tank 1, a lift pump 2 and a main reaction column 8; the adjusting tank 1 is connected to a water distributing trough 3 on the top of the main reaction column 8 through the lift pump 2; The water distributing trough 3 is separately connected to the two independent chambers of a partitioned trough 4; the water out of the partitioned trough 4 is divided by chambers into two channels and flows through the first circulation pump 5 and the second circulation pump 6 respectively; then each channel is further evenly divided into two streams and tangentially flows into an obcone 7—the inflow component of the main reaction column 8—through 2 outlets thereon arranged at different altitude; such a design guarantees a whirled flow being generated within the obcone 7; the conical angle of the obcone 7 is 50°; quartz sand with the particle size at 0.3 mm is filled in the main reaction column 8 as the packing material; guide plates 9 are arranged 2 m above the obcone 7 within the main reaction column 8 so that a plug flow can be generated therein and crystallized particles can be broken up into pieces to form new seed crystals; an inclined plate 10 is arranged above the guide plates 9 to separate solid particles from the effluent; finally, part of the supernatant flowing up through the inclined plate 10 flows back into the partition trough 4 while the other part of the supernatant flows out from the outflow trough 11 opposite the partition trough 4.

A method for wastewater treatment using the device for Fenton fluidized-bed process disclosed in this embodiment, comprising the following steps:

(a). 80% of the total amount of quartz sand (accounting for 20% of the total volume of the main reaction column 8) with the particle size at 0.3 mm is initially added into the main reaction column 8;

(b). adjust the pH value of wastewater in the adjusting tank 1 so that the pH value of wastewater in the reaction column 8 can be controlled at 3.5; adjust the flow rate of the inflow wastewater to guarantee 20 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 40 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of quartz sand with the particle size at 0.3 mm is added in after 100 h of operation;

(g). after a week of operation, reduce the added amount of ferrous sulfate by 50%, and the slag discharge operation is conducted after 11 months of operation.

The device for Fenton fluidized-bed process and the wastewater treatment method thereof disclosed in this embodiment were adopted to treat a biologically treated wastewater discharged from a chemical industry park with COD 114 mg/L and a certain degree of chromaticity; the ratio of added hydrogen peroxide was 0.1% while that of added ferrous iron was 200 mg/L. The results showed that the removal rate of chromaticity, COD and iron reached 100%, 81.25% and 87.10% respectively; after reducing the added amount of ferrous iron by 50%, the removal rate of COD was 80.21%.

Embodiment 3

The device for Fenton fluidized-bed process disclosed in this embodiment is essentially the same in structure with that disclosed in Embodiment 1, with exceptions as follows: the conical angel of the obcone is 40°; building sand with the particle size at 0.5 mm is filled in the main reaction column 8 as the packing material; guide plates 9 are arranged 3 m above the obcone 7 within the main reaction column 8 so that a plug flow can be generated therein and crystallized particles can be broken up into pieces to form new seed crystals.

A method for wastewater treatment using said device, comprising the following steps:

(a). 85% of the total amount of building sand (accounting for 30% of the total volume of the main reaction column 8) with the particle size at 0.5 mm is initially added into the main reaction column 8;

(b). adjust the pH value of wastewater in the adjusting tank 1 so that the pH value of wastewater in the reaction column 8 can be controlled at 4.0; adjust the flow rate of the inflow wastewater to guarantee 30 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 50 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 15% of the total amount of building sand with the particle size at 0.5 mm is added in after 100 h of operation;

(g). after a week of operation, reduce the added amount of ferrous sulfate by 50%, and the slag discharge operation is conducted after 10 months of operation.

The device for Fenton fluidized-bed process and the wastewater treatment method thereof disclosed in this embodiment were adopted to treat a biologically treated wastewater discharged from a chemical industry park with COD 114 mg/L and a certain degree of chromaticity; the ratio of added hydrogen peroxide was 0.1% while that of added ferrous iron was 200 mg/L. The results showed that the removal rate of chromaticity, COD and iron reached 100%, 88.02% and 93.04% respectively; after reducing the added amount of ferrous iron by 50%, the removal rate of COD was 85.94%.

Embodiment 4

The device for Fenton fluidized-bed process disclosed in this embodiment is essentially the same in structure with that disclosed in Embodiment 1, with exceptions as follows: the conical angel of the obcone is 30°; zeolite with the particle size at 0.8 mm is filled in the main reaction column 8 as the packing material; guide plates 9 are arranged 4 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of zeolite (accounting for 40% of the total volume of the main reaction column 8) with the particle size at 0.8 mm is initially added into the main reaction column 8;

(b). adjust the pH value of wastewater in the adjusting tank 1 so that the pH value of wastewater in the reaction column 8 can be controlled at 3.5; adjust the flow rate of the inflow wastewater to guarantee 30 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 80 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of zeolite with the particle size at 0.8 mm is added in after 300 h of operation;

(g). after a week of operation, reduce the added amount of ferrous sulfate by 50%, and the slag discharge operation is conducted after 9 months of operation.

The device for Fenton fluidized-bed process and the wastewater treatment method thereof disclosed in this embodiment were adopted to treat a biologically treated wastewater discharged from a chemical industry park with COD 114 mg/L and a certain degree of chromaticity; the ratio of added hydrogen peroxide was 0.1% while that of added ferrous iron was 200 mg/L. The results showed that the removal rate of chromaticity, COD and iron reached 100%, 87.53% and 92.15% respectively; after reducing the added amount of ferrous iron by 50%, the removal rate of COD was 87.48%.

Embodiment 5

The device for Fenton fluidized-bed process disclosed in this embodiment is essentially the same in structure with that disclosed in Embodiment 1, with exceptions as follows: the conical angel of the obcone is 20°; ceramsite with the particle size at 1 mm is filled in the main reaction column 8 as the packing material; guide plates 9 are arranged 2 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of ceramsite (accounting for 30% of the total volume of the main reaction column 8) with the particle size at 1 mm is initially added into the main reaction column 8;

(b). adjust the pH value of wastewater in the adjusting tank so that the pH value of wastewater in the reaction column can be controlled at 3.5; adjust the flow rate of the inflow wastewater to guarantee 30 min of retention time for the wastewater within the main reaction column;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 100 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of ceramsite with the particle size at 1 mm is added in after 400 h of operation;

(g). after a week of operation, reduce the added amount of ferrous sulfate by 50%, and the slag discharge operation is conducted after 8 months of operation.

The device for Fenton fluidized-bed process and the wastewater treatment method thereof disclosed in this embodiment were adopted to treat a biologically treated nitrified wastewater discharged from a chemical plant with COD 167 mg/L and a certain degree of chromaticity; the ratio of added hydrogen peroxide was 0.15% while that of added ferrous iron was 300 mg/L. The results showed that the removal rate of chromaticity, COD and iron reached 100%, 71.67% and 78.39% respectively; after reducing the added amount of ferrous iron by 50%, the removal rate of COD was 70.11%.

Embodiment 6

The device for Fenton fluidized-bed process disclosed in this embodiment is essentially the same in structure with that disclosed in Embodiment 1, with exceptions as follows: the conical angel of the obcone is 10°; saponite with the particle size at 2 mm is filled in the main reaction column 8 as the packing material; guide plates 9 are arranged 2 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of saponite (accounting for 40% of the total volume of the main reaction column 8) with the particle size at 2 mm is initially added into the main reaction column 8;

(b). adjust the pH value of wastewater in the adjusting tank 1 so that the pH value of wastewater in the reaction column 8 can be controlled at 3.5; adjust the flow rate of the inflow wastewater to guarantee 30 min of retention time for the wastewater within the main reaction column 8;

(c). The wastewater in the adjusting tank 1 is pumped by the lift pump 2 into the water distributing trough 3, and then flows into the partitioned trough 4, where it is mixed with part of the effluent; the mixed wastewater is then pumped by the first circulation pump 5 and the second circulation pump 6 respectively into the obcone 7 for reaction; adjust the reflux ratio and control the upflowing rate within the main reaction column 8 at 150 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of saponite with the particle size at 2 mm is added in after 500 h of operation;

(g). after a week of operation, reduce the added amount of ferrous sulfate by 50%, and the slag discharge operation is conducted after 7 months of operation.

The device for Fenton fluidized-bed process and the wastewater treatment method thereof disclosed in this embodiment were adopted to treat a biologically treated nitrified wastewater discharged from a chemical plant with COD 167 mg/L and a certain degree of chromaticity; the ratio of added hydrogen peroxide was 0.15% while that of added ferrous iron was 300 mg/L. The results showed that the removal rate of chromaticity, COD and iron reached 100%, 72.22% and 78.41% respectively; after reducing the added amount of ferrous iron by 50%, the removal rate of COD was 72.00%.

Embodiment 7

The device for Fenton fluidized-bed process disclosed in this embodiment is essentially the same in structure with that disclosed in Embodiment 1, with exceptions as follows: the conical angel of the obcone is 5°; brick chips with the particle size at 0.5 mm is filled in the main reaction column 8 as the packing material; guide plates 9 are arranged 2 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of brick chips (accounting for 20% of the total volume of the main reaction column 8) with the particle size at 0.5 mm is initially added into the main reaction column 8;

(b). adjust the pH value of wastewater in the adjusting tank 1 so that the pH value of wastewater in the reaction column 8 can be controlled at 3.5; adjust the flow rate of the inflow wastewater to guarantee 30 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 50 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of brick chips with the particle size at 0.5 mm is added in after 200 h of operation;

(g). after a week of operation, reduce the added amount of ferrous sulfate by 50%, and the slag discharge operation is conducted after 6 months of operation.

The device for Fenton fluidized-bed process and the wastewater treatment method thereof disclosed in this embodiment were adopted to treat a biologically treated nitrified wastewater discharged from a chemical plant with COD 167 mg/L and a certain degree of chromaticity; the ratio of added hydrogen peroxide was 0.1% while that of added ferrous iron was 200 mg/L. The results showed that the removal rate of chromaticity, COD and iron reached 100%, 72.28% and 88.71% respectively; after reducing the added amount of ferrous iron by 50%, the removal rate of COD was 72.22%.

Embodiment 8

The device for Fenton fluidized-bed process disclosed in this embodiment is essentially the same in structure with that disclosed in Embodiment 1, with exceptions as follows: the conical angel of the obcone is 20°; activated carbon with the particle size at 3 mm is filled in the main reaction column 8 as the packing material; guide plates 9 are arranged 2 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of activated carbon (accounting for 20% of the total volume of the main reaction column 8) with the particle size at 3 mm is initially added into the main reaction column 8;

(b). adjust the pH value of wastewater in the adjusting tank 1 so that the pH value of wastewater in the reaction column 8 can be controlled at 3.5; adjust the flow rate of the inflow wastewater to guarantee 30 min of retention time for the wastewater within the main reaction column 8;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 80 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being propelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of activated carbon with the particle size at 3 mm is added in after 200 h of operation;

(g). after a week of operation, reduce the added amount of ferrous sulfate by 50%, and the slag discharge operation is conducted after 6 months of operation.

The device for Fenton fluidized-bed process and the wastewater treatment method thereof disclosed in this embodiment were adopted to treat a biologically treated nitrified wastewater discharged from a chemical plant with COD 167 mg/L; the ratio of added hydrogen peroxide was 0.1% while that of added ferrous iron was 200 mg/L. The results showed that the removal rate of COD and iron reached 74.20% and 85.07% respectively; after reducing the added amount of ferrous iron by 50%, the removal rate of COD was 72.86%.

Embodiment 9

The device for Fenton fluidized-bed process disclosed in this embodiment is essentially the same in structure with that disclosed in Embodiment 1, with exceptions as follows: the conical angel of the obcone is 10°; quartz sand with the particle size at 0.5 mm is filled in the main reaction column 8 as the packing material; guide plates 9 are arranged 3 m above the obcone 7 within the main reaction column 8 so that a plug flow can be generated therein and crystallized particles can be broken up into pieces to form new seed crystals.

A method for wastewater treatment using the device for Fenton fluidized-bed process disclosed in this embodiment, comprising the following steps:

(a). 80% of the total amount of the mixture of quartz sand and building sand (accounting for 20% of the total volume of the main reaction column 8; the mixing ratio between quartz sand and building sand is 1:1) with the particle size at 0.5 mm is initially added into the main reaction column 8;

(b). adjust the pH value of wastewater in the adjusting tank so that the pH value of wastewater in the reaction column can be controlled at 3.5; adjust the flow rate of the inflow wastewater to guarantee 30 min of retention time for the wastewater within the main reaction column;

(c). the wastewater in the adjusting tank 1 is pumped by the lift pump 2 into the water distributing trough 3; and then flows out and mixes with part of the effluent within the partitioned trough 4, wherefrom the wastewater is pumped by the first circulation pump 5 and the second circulation pump 6 respectively into the obcone 7 for reaction; adjust the reflux ratio and control the upflowing rate within the main reaction column 8 at 50 m/h; keep the upper edge of the guide plates 9 lower than the top layer of the suspended packing material;

(d). hydrogen peroxide solution and ferrous sulfate solution are added into the two independent chambers of the partitioned trough 4 separately, and then, along with the water flow, are pumped by the first circulation pump 5 and the second circulation pump 6 respectively into the obcone 7;

(e). the whirled flow generated within the obcone 7 guarantees the fluid and the packing material being homogeneously mixed and sufficiently reacted; after being pro-pelled by the plug flow generated by the guide plates 9 and the subsequent separation process, part of the supernatant flows back into the partitioned trough 4 while the other part of the supernatant flows into the outflow trough 11 and is discharged thereafter;

(f). the rest 20% of the total amount of the mixture of quartz sand and building sand with the particle size at 0.5 mm is added in after 200 h of operation;

(g). after a week of operation, reduce the added amount of ferrous sulfate by 50%, and the slag discharge operation is conducted after 9 months of operation.

The device for Fenton fluidized-bed process and the wastewater treatment method thereof disclosed in this embodiment were adopted to treat a biologically treated nitrified wastewater discharged from a chemical plant with COD 167 mg/L and a certain degree of chromaticity; the ratio of added hydrogen peroxide was 0.15% while that of added ferrous iron was 300 mg/L. The results showed that the removal rate of chromaticity, COD and iron reached 100%, 73.41% and 89.67% respectively; after reducing the added amount of ferrous iron by 50%, the removal rate of COD was 72.66%.

The invention claimed is:

1. A device for Fenton fluidized-bed process, comprising an adjusting tank, a lift pump and a main reaction column, wherein the adjusting tank is connected to a water distributing trough on the top of the main reaction column through the lift pump, and said main reaction column is filled with the packing material; said device is characterized in that said main reaction column is provided with an inverted cone below the packing material; a plurality of inlets are provided on the inverted cone and a slag discharge pipe is connected to the bottom of the inverted;

above the packing material within said main reaction column is installed an inclined plate, above which and at the upper end of said main reaction column are arranged with a partitioned trough and an outflow trough; said partitioned trough is evenly divided by a vertical plate into two independent chambers; the upper end of each chamber is connected to said water distributing trough while the lower end of each chamber is designed with an outlet; the outlets of said two independent chambers are connected to the inlets on said inverted cone through the first circulation pump and the second circulation pump respectively; said outflow trough is installed opposite the partitioned trough.

2. A device for Fenton fluidized-bed process as defined in claim 1, characterized in that two pairs of inlets, 4 inlets in total, are symmetrically provided ⅓ and ⅔ of the way up from the bottom of the inverted cone; the mixed fluid out of the two independent chambers is evenly divided into two streams after it flows out of the first circulation pump and the second circulation pump respectively.

3. A device for Fenton fluidized-bed process as defined in claim 1, characterized in that an adjusting pipe is arranged on the top of said water distributing trough to control the inflow load; the other end of the adjusting pipe is connected back to said adjusting tank.

4. A device for Fenton fluidized-bed process as defined in claim 1, characterized in that the conical angle of said inverted cone is 5~60°.

5. A device for Fenton fluidized-bed process as defined in claim 1, characterized in that said packing material is any of the following materials: resin, activated carbon, building sand, quartz sand, zeolite, ceramsite, saponite or brick chips, or any combination thereof; the average grain size of the packing material is 0.1~3.0 mm.

6. A device for Fenton fluidized-bed process as defined in claim 1, characterized in that a plurality of guide plates are arranged within the packing material alongside the vertical axis of the main reaction column, which is therefore divided into a plurality of upflowing tunnels; the distance between the lower edge of the guide plates and the upper end of the inverted cone is 1~4 m.

7. A method for wastewater treatment using the device for Fenton fluidized-bed process as defined in claim 1, comprising the following steps:
  (a). fill the main reaction column with the packing material, which accounts for 10%~40% of the total volume of the main reaction column;
  (b). adjust the pH value of wastewater in the adjusting tank so that the pH value of wastewater in the main reaction column can be controlled at 3.0~4.0; adjust the flow rate of the inflow wastewater to guarantee 10~30 min of retention time for the wastewater within the main reaction column;
  (c). the wastewater in the adjusting tank is pumped by the lift pump into the water distributing trough, and then flows into the partitioned trough, wherefrom the wastewater is pumped by the first circulation pump and the second circulation pump respectively through the inlets on the inverted cone into the main reaction column; adjust the reflux ratio and control the upflowing rate within the main reaction column at 30~150 m/h; keep the upper edge of the guide plates lower than the top layer of the suspended packing material;
  (d). hydrogen peroxide solution and ferrous sulfate solution are added into the two independent chambers of the partitioned trough respectively, and then, along with the waterflow, are pumped by the first circulation pump and the second circulation pump respectively into the inverted cone;
  (e). a whirled flow is generated within the inverted cone, which guarantees water being homogeneously mixed; the mixed fluid then reacts with the packing material; after being propelled by the plug flow generated by the guide plates and the subsequent separation process, part of the supernatant of the mixed fluid flows back into the independent chambers of the partitioned trough while the other part of the supernatant of the mixed fluid flows into the outflow trough and is discharged thereafter;
  (f). after a week of operation, reduce the added amount of ferrous sulfate by 50%, and the slag discharge operation is conducted after 6~12 months of operation.

8. A method for wastewater treatment using the device for Fenton fluidized-bed process as defined in claim 7, characterized in that the packing material mentioned in said step (a) is added in two portions: 75%~85% of its total amount is added at the first time, and the rest 15%~25% is added in after 50~500 h of operation.

9. A device for Fenton fluidized-bed process as defined in claim 2, characterized in that a plurality of guide plates are arranged within the packing material alongside the vertical axis of the main reaction column, which is therefore divided into a plurality of upflowing tunnels; the distance between the lower edge of the guide plates and the upper end of the inverted cone is 1~4 m.

10. A device for Fenton fluidized-bed process as defined in claim 3, characterized in that a plurality of guide plates are arranged within the packing material alongside the vertical axis of the main reaction column, which is therefore divided into a plurality of upflowing tunnels; the distance between the lower edge of the guide plates and the upper end of the inverted cone is 1~4 m.

11. A device for Fenton fluidized-bed process as defined in claim 4, characterized in that a plurality of guide plates are arranged within the packing material alongside the vertical axis of the main reaction column, which is therefore divided into a plurality of upflowing tunnels; the distance between the lower edge of the guide plates and the upper end of the inverted cone is 1~4 m.

12. A device for Fenton fluidized-bed process as defined in claim 5, characterized in that a plurality of guide plates are arranged within the packing material alongside the vertical axis of the main reaction column, which is therefore divided into a plurality of upflowing tunnels; the distance between the lower edge of the guide plates and the upper end of the inverted cone is 1~4 m.

* * * * *

UNITED STATES PATENT AND TRADEMARK OFFICE
CERTIFICATE OF CORRECTION

| | | |
|---|---|---|
| PATENT NO. | : 10,183,878 B2 | Page 1 of 1 |
| APPLICATION NO. | : 15/118734 | |
| DATED | : January 22, 2019 | |
| INVENTOR(S) | : Aimin Li | |

It is certified that error appears in the above-identified patent and that said Letters Patent is hereby corrected as shown below:

In the Claims

Column 16, Line 33:
"to the bottom of the inverted;" should read, --to the bottom of the inverted cone;--.

Signed and Sealed this
Thirty-first Day of December, 2019

Andrei Iancu
*Director of the United States Patent and Trademark Office*